(12) United States Patent
Okamura

(10) Patent No.: US 10,895,493 B2
(45) Date of Patent: Jan. 19, 2021

(54) WEIGHING APPARATUS THAT DETERMINES CONTAINER OF OBJECT AND NET WEIGHT OF THE OBJECT USING WEIGHT OF THE CONTAINER

(71) Applicant: TOSHIBA TEC KABUSHIKI KAISHA, Tokyo (JP)

(72) Inventor: Atsushi Okamura, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 170 days.

(21) Appl. No.: 16/107,542

(22) Filed: Aug. 21, 2018

(65) Prior Publication Data

US 2019/0072427 A1 Mar. 7, 2019

(30) Foreign Application Priority Data

Sep. 1, 2017 (JP) ................................. 2017-168736

(51) Int. Cl.
*G01G 19/414* (2006.01)
*G06K 9/00* (2006.01)
*G07G 1/00* (2006.01)
*G06Q 20/20* (2012.01)
*G01G 19/415* (2006.01)

(52) U.S. Cl.
CPC ....... *G01G 19/4144* (2013.01); *G01G 19/415* (2013.01); *G06K 9/00664* (2013.01); *G06Q 20/208* (2013.01); *G07G 1/0009* (2013.01); *G07G 1/0063* (2013.01); *G07G 1/0072* (2013.01); *G06K 2209/17* (2013.01)

(58) Field of Classification Search
CPC ............. G01G 19/4144; G01G 19/415; G06K 9/00664; G06K 2209/17; G07G 1/0009; G07G 1/0063; G07G 1/0072; G06Q 20/208

See application file for complete search history.

(56) References Cited

U.S. PATENT DOCUMENTS 6,005,959 A * 12/1999 Mohan ................. G01B 11/024 348/89
7,320,429 B2 * 1/2008 Muto .................. G01G 19/4144 186/59
8,136,727 B2 * 3/2012 Rollyson ............ G01G 19/4144 235/375

(Continued)

FOREIGN PATENT DOCUMENTS

JP    2016-176795 A   10/2016
WO   2013/028378 A2   2/2013

OTHER PUBLICATIONS

Computer translation of JP 2016-176795 downloaded Apr. 2, 2020 from the Japanese Patent Office website.*

(Continued)

*Primary Examiner* — Randy W Gibson
(74) *Attorney, Agent, or Firm* — Kim & Stewart LLP

(57) ABSTRACT

In accordance with an embodiment, a weighing apparatus includes a plurality of weighing scales and a processor. Each of the plurality of weighing scales measures weight of the object to be weighed which is placed on the plurality of weighing scales. The processor calculates net weight of the object to be weighed on the basis of the weight measured by each of the plurality of weighing scales.

12 Claims, 10 Drawing Sheets

(56) References Cited

U.S. PATENT DOCUMENTS

| | | | |
|---|---|---|---|
| 8,732,024 B2 * | 5/2014 | Jacobs | G07G 1/01 |
| | | | 705/23 |
| 8,876,001 B2 * | 11/2014 | Herwig | G07G 1/14 |
| | | | 235/375 |
| 9,004,271 B2 | 4/2015 | Fourney | |
| 9,679,327 B2 * | 6/2017 | Herring | G06K 9/00255 |
| 2005/0097064 A1 * | 5/2005 | Werden | G01G 19/4144 |
| | | | 705/400 |
| 2006/0196935 A1 * | 9/2006 | Muto | G01G 19/4144 |
| | | | 235/383 |
| 2006/0261157 A1 * | 11/2006 | Ostrowski | A47F 11/10 |
| | | | 235/383 |
| 2009/0152348 A1 * | 6/2009 | Ostrowski | A47F 11/10 |
| | | | 235/383 |
| 2010/0076855 A1 * | 3/2010 | Karnin | A47F 9/047 |
| | | | 705/24 |
| 2013/0126248 A1 | 5/2013 | Yamaguchi et al. | |
| 2013/0235368 A1 * | 9/2013 | Tornwall | A47F 9/047 |
| | | | 356/51 |
| 2015/0062560 A1 * | 3/2015 | Tornwall | A47F 9/047 |
| | | | 356/51 |
| 2016/0109281 A1 | 4/2016 | Herring et al. | |
| 2017/0249617 A1 * | 8/2017 | Okamura | G01G 19/415 |
| 2018/0314866 A1 * | 11/2018 | Kotula | G06K 9/20 |

OTHER PUBLICATIONS

Extended European Search Report dated Feb. 4, 2019, filed in counterpart European Patent Application No. 18190201.6, 8 pages.

* cited by examiner

| SHAPE | SIZE | CONTAINER TYPE | CONTAINER WEIGHT |
|---|---|---|---|
| RECTANGLE | YY | A1 | 5g |
| RECTANGLE | XX | A2 | 4g |
| ⋮ | ⋮ | ⋮ | ⋮ |
| CIRCLE | ZZ | B5 | 6g |

Fig.7

| COMMODITY | UNIT PRICE |
|---|---|
| COMMODITY 1 | 120YEN/100 g |
| COMMODITY 2 | 85YEN/100 g |
| COMMODITY 3 | 165YEN/100 g |
| ⋮ | ⋮ |

Fig.8

PARTIAL WEIGHT

| WEIGHING SCALE | 24-1 | 24-2 | 24-3 | 24-4 | 24-5 | 24-6 |
|---|---|---|---|---|---|---|
| PARTIAL WEIGHT | 50g | 50g | 0g | 45g | 45g | 130g |

Fig.10

CORRESPONDENCE BETWEEN CONTAINER (COMMODITY) AND SCALE

| WEIGHING SCALE / CONTAINER (COMMODITY) | 24-1 | 24-2 | 24-3 | 24-4 | 24-5 | 24-6 |
|---|---|---|---|---|---|---|
| 1 | ◯ | ◯ | | ◯ | ◯ | |
| 2 | | | | | | ◯ |

Fig.11

COMMODITY WEIGHT

| WEIGHING SCALE / COMMODITY | 24-1 | 24-2 | 24-3 | 24-4 | 24-5 | 24-6 | COMMODITY WEIGHT |
|---|---|---|---|---|---|---|---|
| 1 | 50g | 50g | | 45g | 45g | | 190g |
| 2 | | | | | | 130g | 130g |

Fig.12

CONTAINER WEIGHT

| CONTAINER | CONTAINER WEIGHT |
|---|---|
| 1 | 5g |
| 2 | 4g |

Fig.13

NET WEIGHT

| COMMODITY | COMMODITY WEIGHT | CONTAINER WEIGHT | NET WEIGHT |
|---|---|---|---|
| 1 | 190g | 5g | 185g |
| 2 | 130g | 4g | 126g |

Fig.14

WEIGHING APPARATUS THAT DETERMINES CONTAINER OF OBJECT AND NET WEIGHT OF THE OBJECT USING WEIGHT OF THE CONTAINER

CROSS-REFERENCE TO RELATED APPLICATION

This application is based upon and claims the benefit of priority from the prior Japanese Patent Application No. 2017-168736, filed on Sep. 1, 2017, the entire contents of which are incorporated herein by reference.

FIELD

An embodiment described here generally relates to a weighing apparatus.

BACKGROUND

In general, a store such as a department store and a supermarket sells commodities whose prices are determined in a manner that depends on weight of the commodities, so-called commodities sold by weight. In a case of selling commodities by weight, a commodity, which is contained in a container such as a commodity tray, is weighed, and a price of the commodity is determined in a manner that depends on a result of weighing. A label indicating the price determined depending on the weight of the commodity is attached to the commodity tray.

A traditional weighing apparatus measures weight of a commodity placed on a weighing section as a sales unit. Thus, in a case where a plurality of commodities are placed on the weighing section, the weighing apparatus weighs total weight of the plurality of commodities.

That is, in a case of individually selling commodities, the traditional weighing apparatus is capable of weighing a plurality of commodities together but the traditional weighing apparatus is incapable of measuring weight of each commodity, and thus a price of each commodity cannot be determined. Thus, with the traditional weighing apparatus, it is necessary to do weighing work for each commodity that is the sales unit, which contributes to heavy work load.

BRIEF DESCRIPTION OF THE DRAWINGS

FIG. 7 is a diagram showing an example of container data according to the embodiment.

FIG. 8 is a diagram showing an example of commodity price data according to the embodiment.

FIG. 10 is a diagram showing partial weight sensed by each of weighing scales.

FIG. 11 is a diagram showing correspondence between containers (commodities) and the weighing scales.

FIG. 12 is a diagram showing partial weight of each commodity and commodity weight of each commodity.

FIG. 13 is a diagram showing container weight determined with respect to each of the containers (commodities).

FIG. 14 is a diagram showing net weight of each commodity.

DETAILED DESCRIPTION

In accordance with one embodiment, a weighing apparatus includes a plurality of weighing scales and a processor. On the plurality of weighing scales, an object to be weighed is placed. Each of plurality of weighing scales measures weight of the placed object to be weighed. The processor calculates net weight of the object to be weighed on the basis of the weight measured by each of the plurality of weighing scales.

Figure 1:
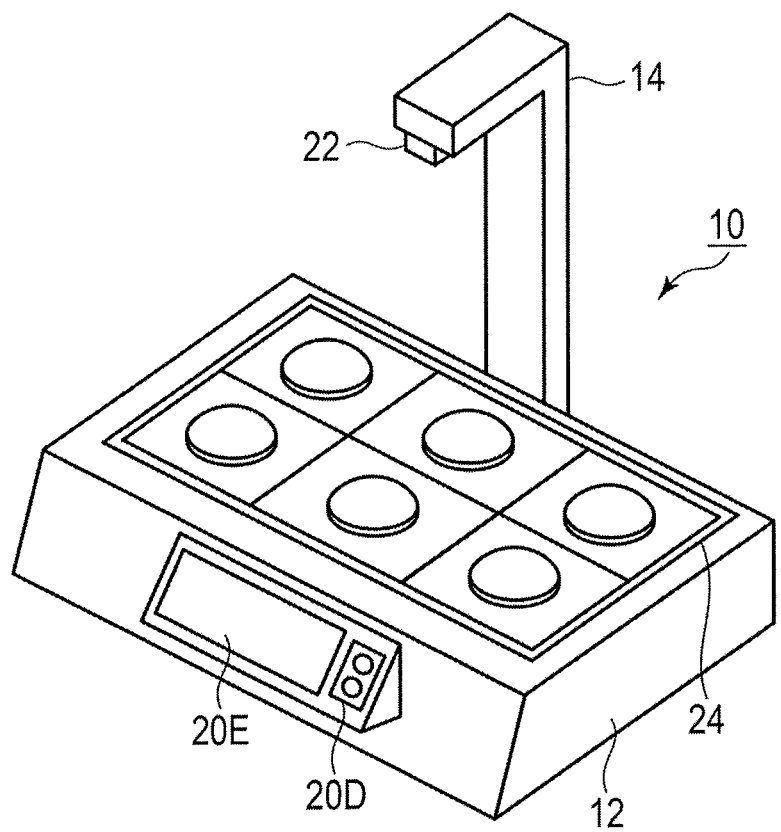
FIG. 1 is a diagram showing an example of an appearance configuration of a weighing apparatus according to an embodiment.

Hereinafter, an embodiment will be described with reference to the drawings. In the drawings, identical symbols denote identical or similar parts. FIG. 1 is a diagram showing an example of an appearance configuration of a weighing apparatus 10 of this embodiment. As shown in FIG. 1, the weighing apparatus 10 includes, at a top portion of a main body 12, a weighing unit 24 for weighing an object to be weighed such as a commodity. A detailed configuration of the weighing unit 24 will be described later. A camera 22 is provided above the weighing unit 24. The camera 22 is supported by a supporting member 14. The camera 22 takes an image of the whole of the weighing unit 24, which includes an object to be weighed which is placed on the weighing unit 24, from above, and outputs image data of the taken image. The main body 12 includes, at a front portion thereof, an input apparatus 20D and a display apparatus 20E.

Figure 2:
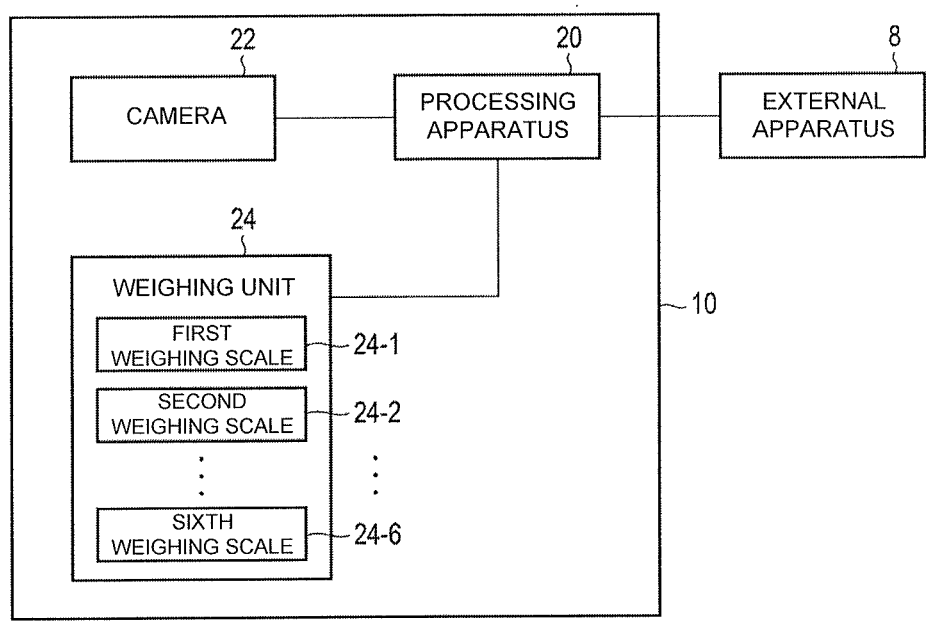
FIG. 2 is a block diagram showing a configuration of the weighing apparatus according to the embodiment.

FIG. 2 is a block diagram showing a configuration of the weighing apparatus 10 according to this embodiment. As shown in FIG. 2, the weighing apparatus 10 includes a processing apparatus 20, the camera 22, and the weighing unit 24. The weighing unit 24 includes a plurality of weighing scales. The weighing unit 24 of this embodiment includes, for example, six weighing scales of a first weighing scale 24-1, a second weighing scale 24-2, a third weighing scale 24-3, a fourth weighing scale 24-4, a fifth weighing scale 24-5, and a sixth weighing scale 24-6 (see FIG. 4). Each of the plurality of weighing scales 24-1 to 24-6 includes placing portions 24-1A to 24-6A (see FIG. 4). Each of the plurality of weighing scales 24-1 to 24-6 measures weight of objects to be weighed which are placed on the placing portions 24-1A to 24-6A and outputs weight data of the measured weight to the processing apparatus 20.

Under the control of the processing apparatus 20, the camera 22 takes an image in the process of weighing the object(s) to be weighed by the weighing unit 24, and outputs image data of the taken image to the processing apparatus 20. The image taken by the camera 22 is used for identifying the objects to be weighed which are placed on the weighing unit 24, identifying containers in which the objects to be weighed are contained, and determining correspondence between the objects to be weighed and the weighing scales 24-1 to 24-6, for example.

On the basis of the weight measured by the plurality of weighing scales 24-1 to 24-6, the processing apparatus 20 executes processing for outputting results of weighing the objects to be weighed. The processing apparatus 20 is connected to an external apparatus 8 and outputs data indicating the results of weighing to the external apparatus 8. For example, the external apparatus 8 is a printer that prints prices based on the results of weighing the objects to be weighed (commodities) by the weighing unit 24, on a sheet for a label. For example, the external apparatus 8 is a commodity registration apparatus that registers, on the basis of the results of weighing the objects to be weighed (commodities), commodities (including commodity codes and prices) as objects to be purchased by a customer.

A label-issuing apparatus or the like can be realized by combining the weighing apparatus 10 with the printer. The label-issuing apparatus issues a label on which information regarding weight of the commodities weighed by the weighing apparatus 10, unit prices, a price, and the like has been printed. The commodities weighed by the weighing apparatus 10 are sold with labels issued by the label-issuing apparatus attached to those commodities. Further, a point of sales (POS) terminal or the like can be realized by combining the weighing apparatus 10 with the commodity registration apparatus.

Note that the external apparatus 8 is not limited to the printer and the commodity registration apparatus, and any apparatus can be employed as the external apparatus 8 as long as it can have a function capable of executing processing using a result of weighing of the weighing apparatus 10.

Figure 3:
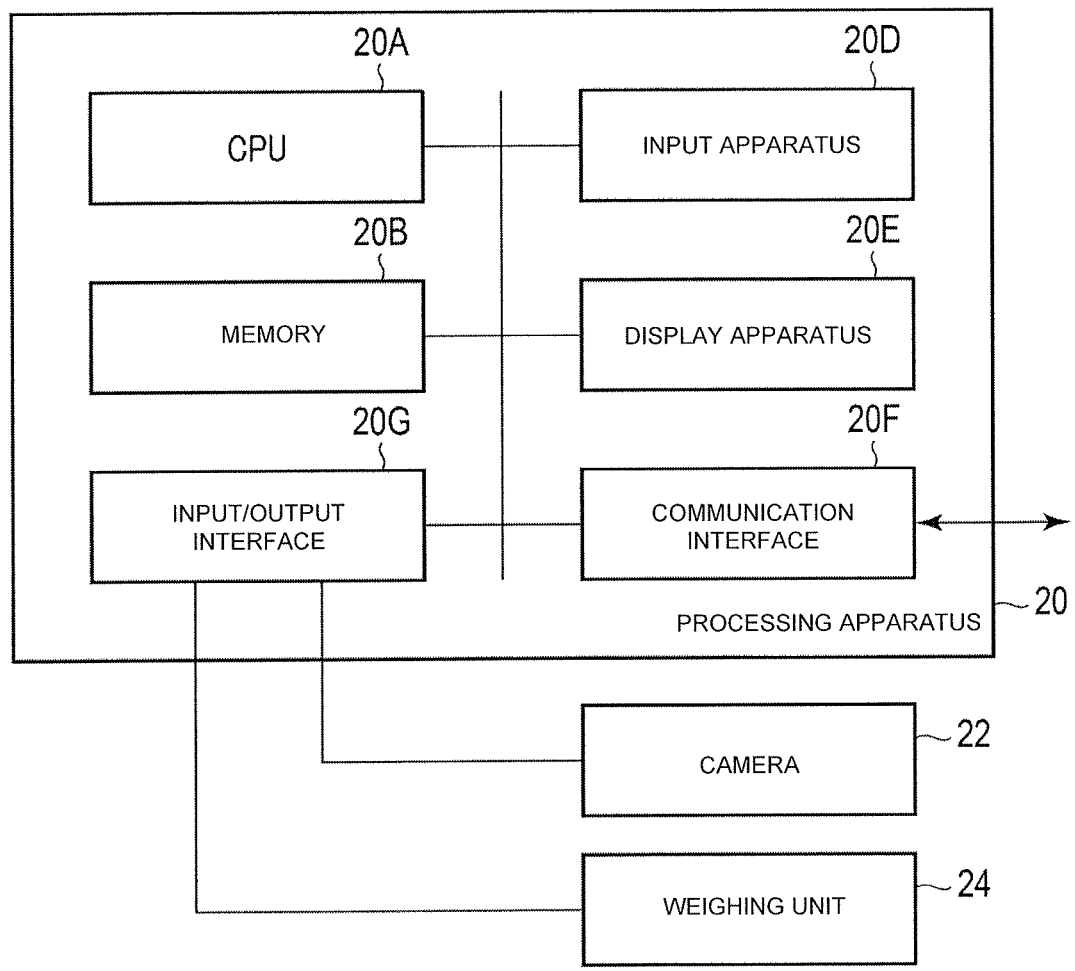
FIG. 3 is a block diagram showing a configuration of a processing apparatus of the weighing apparatus according to the embodiment.

FIG. 3 is a block diagram showing a configuration of the processing apparatus 20 according to this embodiment. The processing apparatus 20 has a function of a computer. The processing apparatus 20 includes a processor 20A, a memory 20B, the input apparatus 20D, the display apparatus 20E, a communication interface 20F, and an input/output interface 20G.

The processor 20A is a central processing unit (CPU), for example. Hereinafter, the processor 20A will be referred to as the CPU 20A. The CPU 20A comprehensively controls the weighing apparatus 10 by executing a control program. By executing a weighing program, the CPU 20A executes control on measurement of weight of the objects to be weighed by the weighing unit 24 (weighing scales 24-1 to 24-6) and also executes output control to output results of weighing the objects to be weighed on the basis of the measured weight. In a case where a plurality of objects to be weighed are placed on and weighed by the weighing unit 24, the CPU 20A determines correspondence between each of the plurality of objects to be weighed and the weighing scales 24-1 to 24-6. The correspondence indicates on which of the plurality of weighing scales 24-1 to 24-6 each of the plurality of objects to be weighed is placed. Then, the CPU 20A outputs a result of weighing each of the objects to be weighed on the basis of the weight measured by the weighing scales respectively corresponding to the objects to be weighed. The CPU 20A selectively outputs data regarding commodity weight, net weight, container weight, and a commodity price, for example, as the result of weighing the objects to be weighed by the weighing unit 24. Note that the commodity weight is weight including the net weight of the commodity and the container weight. Hereinafter, the commodity weight, the net weight, and the container weight will be sometimes collectively referred to as weight of the commodity. Further, in a case where a plurality of commodities are weighed, the CPU 20A selectively outputs data regarding total weight of the plurality of commodities, a total price of the plurality of commodities, commodity weight of each commodity, and a commodity price of each commodity, and the like. Data regarding which of those contents is to output may be preset in a manner that depends on the function of the external apparatus 8 or may be changed in accordance with an instruction to the weighing apparatus 10 from the input apparatus 20D, for example.

The CPU 20A identifies a commodity and a container, which are included in the object to be weighed, by an existing image-processing technique on the basis of the image of the object to be weighed which is placed on the weighing unit 24, which is taken by the camera 22, for example. Note that the commodity and the container as the object to be weighed by the weighing unit 24 may be identified not only by image processing but also by reading an image code (e.g., barcode) added to the commodity (or the container). Further, the commodity and the container as the object to be weighed by the weighing unit 24 may be identified by receiving data (identification code indicating the commodity or the container which is prestored in a radio frequency (RF) tag) through short-distance wireless communication from that tag, for example.

The memory 20B stores various types of programs to be executed by the CPU 20A and various types of data related to execution of various types of processing. The memory 20B includes a storage area to be used as a work area for processing of the CPU 20A. Moreover, the memory 20B includes a nonvolatile storage area for storing the various types of programs and the various types of data. In order to calculate net weight and a price of the commodity, which is included in the object to be weighed by the weighing unit 24, the memory 20B stores container data (see FIG. 7) and commodity price data (see FIG. 8). The container data is data in which data indicating the weight of the container that contains the commodity is set to each of a plurality of container types. The commodity price data is data in which a price of a predetermined unit (unit price) of each commodity is set. For example, the container data and the commodity price data may be stored through the external apparatus 8 or may be stored by an input operation on the input apparatus 20D.

The input apparatus 20D includes a touch panel, a button(s), and a keyboard. The input apparatus 20D inputs an instruction for controlling the operation of the weighing apparatus 10. The input apparatus 20D is operated for instructing to weigh the objects to be weighed which are placed on the weighing unit 24, for example.

Under the control of the CPU 20A, the display apparatus 20E displays an operation state, a result of weighing, and the like of the weighing apparatus 10. The input/output interface 20G connects to the camera 22 and the weighing unit 24, which are external devices (devices not included in the processing apparatus 20). Note that a printing apparatus may be connected to the weighing apparatus 10 to thereby print and output a result of weighing and the like on a piece of paper (e.g., roll paper), for example.

Figure 4:
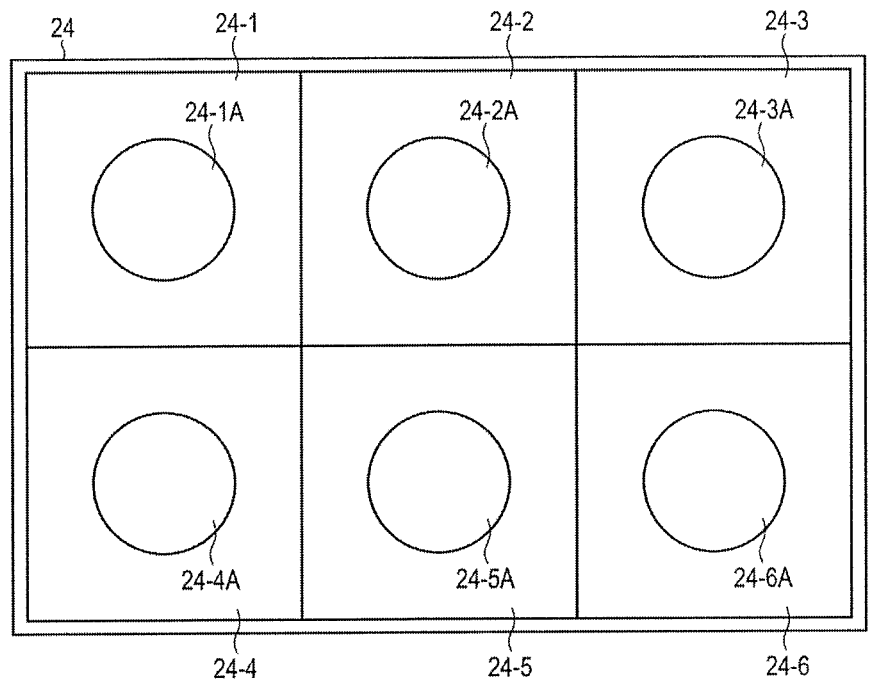
FIG. 4 is a diagram for describing a weighing unit of the weighing apparatus according to the embodiment.
Figure 5:
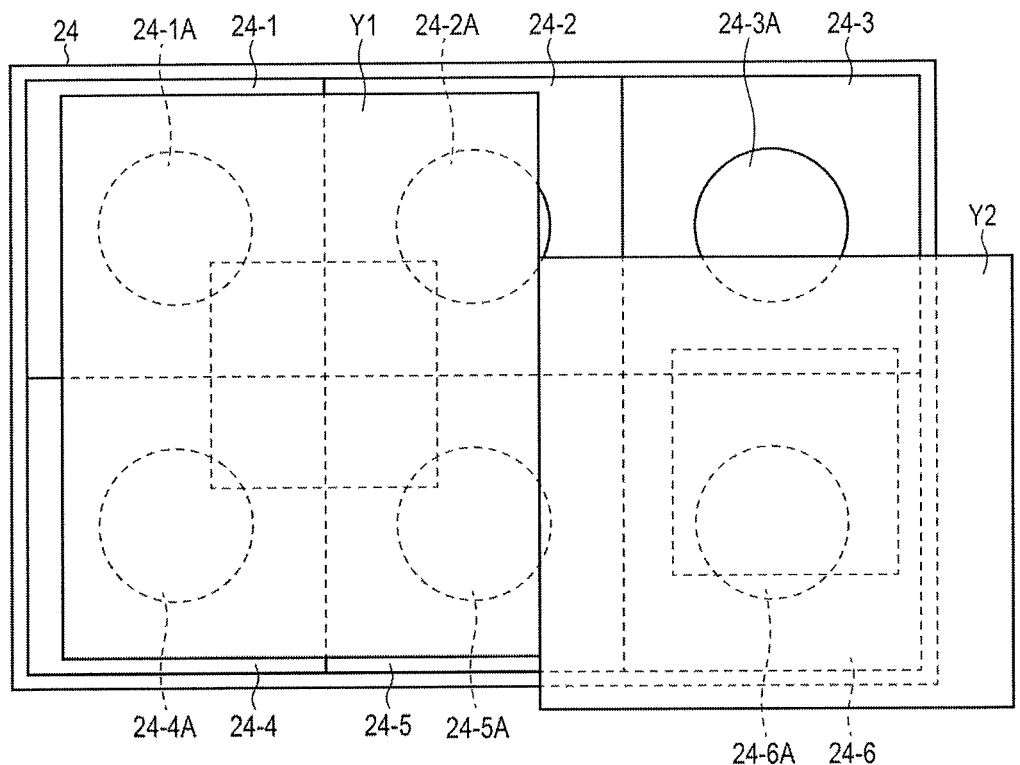
FIG. 5 is a diagram for describing the weighing unit of the weighing apparatus according to the embodiment.
Figure 6:
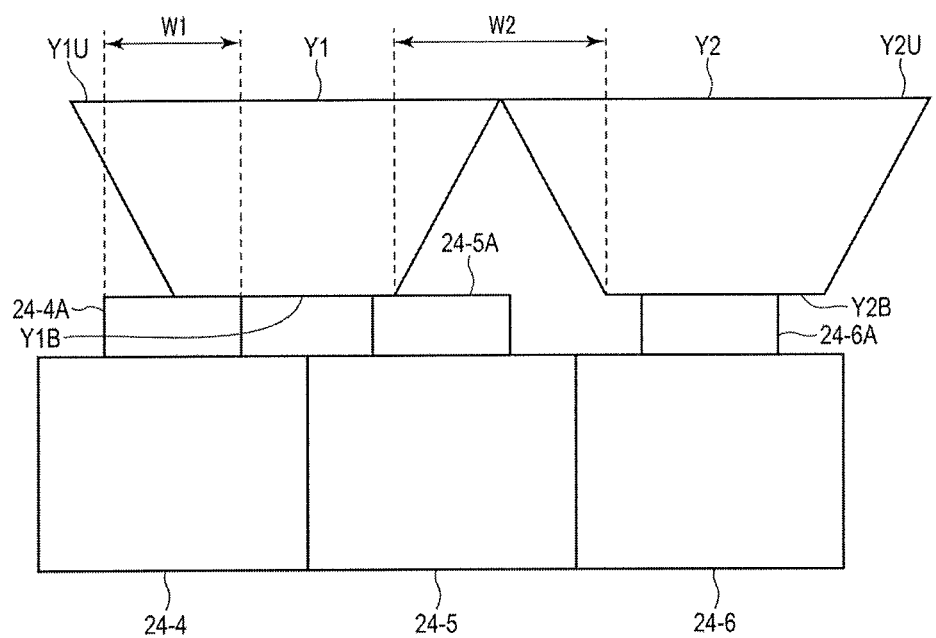
FIG. 6 is a diagram for describing the weighing unit according to the embodiment.

FIGS. 4, 5, and 6 are diagrams for describing the weighing unit 24 according to this embodiment. FIG. 4 is a plan view showing a configuration of the weighing unit 24 according to this embodiment. FIG. 5 is a plan view showing a state in which two containers Y1, Y2 in which the commodities are contained as objects to be weighed are placed on the weighing unit 24. FIG. 6 is a side view showing the state in which the two containers Y1, Y2 shown in FIG. 5 are placed. Note that in the following description, it is assumed that the commodities are contained in the containers Y1, Y2 unless specifically noted otherwise.

As shown in FIG. 4, the weighing unit 24 includes the six weighing scales 24-1 to 24-6, for example. The six weighing scales 24-1 to 24-6 are arranged in a 2-by-3 array, for example, on the top portion of the main body 12. The placing portions 24-1A to 24-6A are formed in the weighing scales 24-1 to 24-6, respectively. On the placing portions 24-1A to 24-6A, the objects to be weighed are to be placed. Placing surfaces of the placing portions 24-1A to 24-6A on which the objects to be weighed are placed are circular flat surfaces, for example.

As shown in FIG. 6, the placing portions 24-1A to 24-6A are formed in a convex shape and are spaced apart from one another by a predetermined distance. By spacing the placing portions provided in the plurality of weighing scales 24-1 to 24-6 apart from one another in the weighing unit 24 of this embodiment, two or more objects to be weighed is prevented from being placed on one placing portion. That is, even in a case where the plurality of objects to be weighed are placed on the weighing unit 24, each of the weighing scales 24-1 to 24-6 measures weight of any one of the objects to be weighed.

For example, as shown in FIGS. 5 and 6, it is assumed that two objects to be weighed of the container Y1 in which a commodity 1 is contained and the container Y2 in which a commodity 2 is contained are placed on the weighing unit 24. In this case, as shown in FIG. 6, a bottom portion Y1B of the container Y1 is placed on the placing portions 24-1A, 24-2A, 24-4A, 24-5A, and thus, the first weighing scale 24-1, the second weighing scale 24-2, the fourth weighing scale 24-4, and the fifth weighing scale 24-5 weigh the container Y1 in which the commodity 1 is contained. Similarly, a bottom portion Y2B of the container Y2 is placed on the placing portions 24-6A, and thus, the sixth weighing scale 24-6 weighs the container Y2 in which the commodity 2 is contained.

As shown in FIG. 6, it is assumed that containers formed such that a width W1 (diameter of the circular shape) of the placing surface of each of the placing portions 24-1A to 24-6A is smaller than a distance W2 between the bottom portions Y1B, Y2B when the containers Y1, Y2 are arranged at their closest positions to each other are to be used in the weighing apparatus 10 of this embodiment. The containers Y1, Y2 have bottom portions Y1B, Y2B and top portions Y1U, Y2U, respectively. The bottom portions Y1B, Y2B have a width smaller than that of the top portions Y1U, Y2U, respectively. Thus, when the plurality of containers Y1, Y2 are placed on the weighing unit 24, at least a distance between the bottom portions Y1B, Y2B is longer than the distance W1. Thus, the use of the containers formed in that relationship between the width W1 and the distance W2 enables each of the weighing scales 24-1 to 24-6 to weigh only one object to be weighed.

Note that in the example shown in FIGS. 5 and 6, the top portions Y1U, Y2U and the bottom portions Y1B, Y2B of the containers Y1, Y2 have a rectangular shape. Alternatively, other containers having a circular shape or another shape, for example, may be used in the weighing apparatus 10.

Further, the weighing unit 24 shown in FIGS. 4 to 6 is merely an example and the weighing unit is not limited thereto. For example, the weighing scales 24-1 to 24-6 are not limited to the six weighing scales and a plurality of weighing scales other than the six weighing scales may be alternatively employed. Although the weighing scales 24-1 to 24-6 are arranged in the 2-by-3 array in FIGS. 4 to 6, another array may be alternatively employed.

Further, in FIGS. 4 to 6, regarding the plurality of weighing scales 24-1 to 24-6, a distance between the placing portions of the weighing scales horizontally adjacent to each other is equal to a distance between the placing portions of the weighing scales vertically adjacent to each other (these are horizontally and vertically arranged at equal intervals). Moreover, the distance between the placing portions of the weighing scales vertically adjacent to each other and the distance between the placing portions of the weighing scales horizontally adjacent to each other are different from a distance between the placing portions of the weighing scales obliquely adjacent to each other. In contrast, the weighing scales may be arranged such that intervals of the placing portions provided in the plurality of weighing scales are equal in all the directions. Alternatively, the plurality of weighing scales may be arranged such that the intervals of the placing portions provided in the plurality of weighing scales are not equal.

Alternatively, the shape of the placing portion is not limited to the circular shape and another shape may be alternatively employed. Although the placing portions of the weighing scales are formed in a planar shape so as to be capable of supporting the objects to be weighed which are placed on the weighing unit 24, the placing portions of the weighing scales may be formed in a shape having a smaller contact surface with the objects to be weighed if many weighing scales are used, for example. By employing the shape having the smaller contact surface with the objects to be weighed, it is possible to physically prevent two or more objects to be weighed from being placed on one placing portion.

Although it is assumed that the weighing unit 24 weighs the commodities contained in the containers in the above description, it is also possible to weigh only commodities (e.g., fruits, vegetables, and the like) without containers as a matter of course. In a case of measuring weight of a plurality of commodities without containers, it is only necessary to place the plurality of commodities such that two or more commodities are not placed on one placing portion of the weighing scale for weighing.

FIG. 7 is a diagram showing an example of the container data according to this embodiment. The container data is data in which data indicating the weight of the container that contains the commodity is set to each of a plurality of container types. It is assumed that the container data regarding each of the containers to be used for weighing in the weighing apparatus 10 is input into the weighing apparatus 10 in advance before the weighing is carried out.

In the example of the container data shown in FIG. 7, each type of data regarding a shape and a size of the container in plan view, a container type (identification data), and container weight, for example, is set in association with the corresponding container. For example, the container of the container type "A1" indicates that the shape in plan view is "Rectangle", the size is "YY", and the container weight is "5 g".

FIG. 8 is a diagram showing an example of the commodity price data according to this embodiment. The commodity price data is data in which a price of a predetermined unit of each commodity (unit price per unit weight of 100 g) is set. The commodity price data is data to be used in outputting a commodity price on the basis of the weight of the commodity which is measured by the weighing unit 24. It is assumed that the commodity price data regarding each of the containers to be used for weighing in the weighing apparatus 10 is input into the weighing apparatus 10 in advance before the weighing is carried out.

Figure 9:
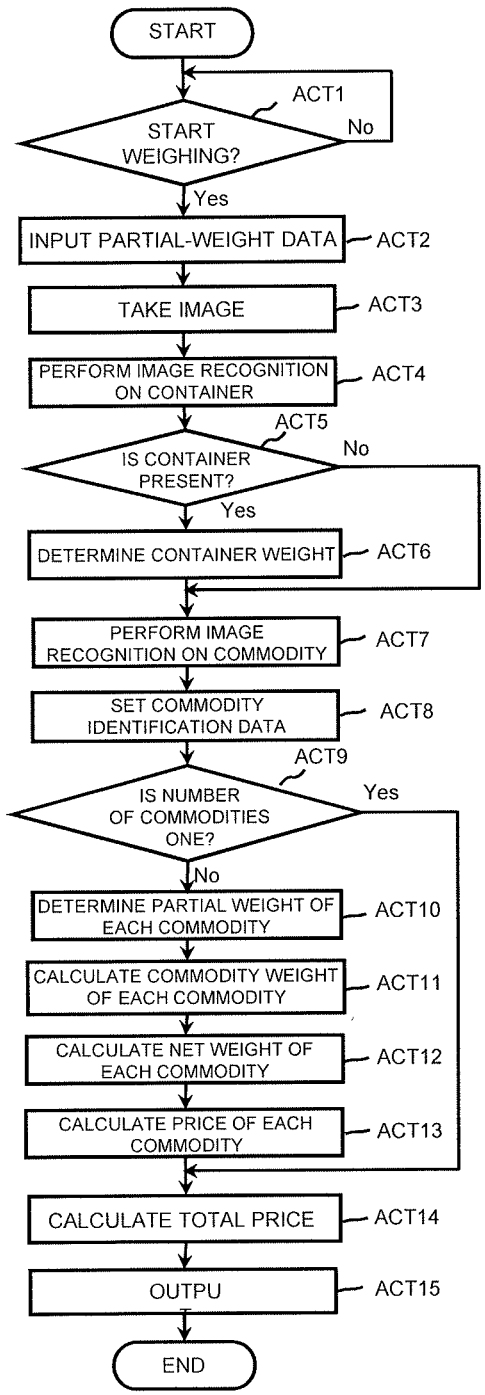
FIG. 9 is a flowchart showing an example of an operation of the weighing apparatus according to the embodiment.

Next, an operation of the weighing apparatus 10 according to this embodiment will be described. FIG. 9 is a flowchart showing an example of control processing of the CPU 20A for the operation of the weighing apparatus 10 according to this embodiment.

Here, the control processing of the CPU 20A will be described assuming that the two objects to be weighed of the container Y1 in which the commodity 1 is contained and the container Y2 in which the commodity 2 is contained are weighed as shown in FIGS. 5 and 6. The commodities 1, 2 are different commodities and unit prices of the commodities 1, 2 are different (corresponding to "Commodity 1" and "Commodity 2" of the commodity price data shown in FIG. 8). Further, it is assumed that the weighing apparatus 10 is set to output at least commodity identification data indicating each of the commodities 1, 2 and data regarding net weight corresponding to the commodity identification data to the external apparatus 8.

First of all, in ACT1 of FIG. 9, the CPU 20A determines whether or not an input for instructing to start the weighing is detected by the input apparatus 20D. For example, when an instruction to start the weighing is given by an input operation on the input apparatus 20D in a state in which the containers Y1, Y2 are placed on the weighing unit 24, the CPU 20A determines that the input for instructing to start the weighing is detected by the input apparatus 20D. If the CPU 20A determines that the input for instructing to start the weighing is detected by the input apparatus 20D (Yes in ACT1), the processing of the CPU 20A shifts to ACT2. In ACT2, the CPU 20A inputs partial-weight data indicating weight sensed by each of the weighing scales 24-1 to 24-6 (hereinafter, referred to as partial weight) from the weighing scales 24-1 to 24-6 via the input/output interface 20G. The CPU 20A stores the input partial-weight data in the memory 20B. FIG. 10 shows the partial weight sensed by each of the weighing scales 24-1 to 24-6, which is stored in the memory 20B in the processing of ACT2.

Next, in ACT3 of FIG. 9, the CPU 20A causes the camera 22 to take an image in weighing the objects to be weighed by the weighing unit 24. The CPU 20A inputs image data of the image including the objects to be weighed which are placed on the weighing unit 24, which is taken by the camera 22, from the camera 22 via the input/output interface 20G. In ACT4, the CPU 20A performs image recognition processing with respect to the containers by using the image taken by the camera 22. Here, the plurality of container types set in the container data is considered as objects to be recognized.

In the case where the two types of containers Y1, Y2 shown in FIG. 5 are placed on the weighing unit 24, the CPU 20A recognizes the container Y1 as the container type "A1" whose shape in plan view is "Rectangle" and whose size is "YY". Further, the CPU 20A recognizes the container Y2 as the container type "A2" whose shape in plan view is "Rectangle" and whose size is "XX".

Moreover, in ACT4, the CPU 20A determines the weighing scales in which the containers are placed on the placing portions, on the basis of a container shape (e.g., size and shape of the bottom portion) according to the container type. By determining the weighing scales on which the containers are placed, the CPU 20A determines correspondence between each of the containers (objects to be weighed) and the weighing scales 24-1 to 24-6. In the example shown in FIG. 5, correspondence between the container Y1 indicated by the container type "A1" and the first weighing scale 24-1, the second weighing scale 24-2, the fourth weighing scale 24-4, and the fifth weighing scale 24-5 is determined. Further, correspondence between the container Y2 indicated by the container type "A2" and the sixth weighing scale 24-6 is determined. FIG. 11 shows the correspondence between the containers (commodities) and the weighing scales 24-1 to 24-6, which is determined in the processing of ACT4.

That is, in FIG. 11, the container Y1 (commodity 1) is placed on the first weighing scale 24-1, the second weighing scale 24-2, the fourth weighing scale, and the fifth weighing scale 24-5. In other words, the container Y1 is placed across the first weighing scale 24-1, the second weighing scale 24-2, the fourth weighing scale, and the fifth weighing scale 24-5. Further, the container Y2 (commodity 2) is placed on the sixth weighing scale 24-6. Note that either of the containers Y1, Y2 is not placed on the third weighing scale 24-3.

Next, in ACT5 of FIG. 9, the CPU 20A determines whether or not the containers are placed on the weighing unit 24 by performing recognition processing with respect to the containers. If the CPU 20A determines that the containers are placed on the weighing unit 24 (Yes in ACT5), the processing of the CPU 20A shifts to ACT6. In ACT6, the CPU 20A determines container weight corresponding to the corresponding container type by referring to the container data. As shown in the container data of FIG. 7, container weight "5 g" is determined with respect to the container type "A1" and container weight "4 g" is determined with respect to the container type "A2". FIG. 13 shows the container weight determined with respect to the containers (commodities) in the processing of ACT6.

Next, in ACT7, the CPU 20A identifies the commodities by performing the image recognition processing on the basis of the image taken by the camera 22, for example. In ACT8, the CPU 20A sets commodity identification data indicating the recognized commodities. The CPU 20A stores the commodity identification data in association with the data indicating the types of the containers in which the recognized commodities are contained, in the memory 20B, for example.

Note that if the CPU 20A cannot identify the containers by performing the recognition processing with respect to the containers, i.e., the CPU 20A determines that the containers are not placed on the weighing unit 24 (No in ACT5), the processing of the CPU 20A shifts to ACT7. As in the above, the CPU 20A identifies the commodities by performing the image recognition processing on the basis of the image taken by the camera 22 (ACT7) and sets commodity identification data indicating the identified commodities (ACT8).

Next, in ACT9, the CPU 20A determines whether or not the number of containers (commodities) weighed by the weighing unit 24 is one. If the CPU 20A determines that the number of containers (commodities) weighed by the weighing unit 24 is not one (No in ACT9), the processing of the CPU 20A shifts to ACT10. In ACT10, the CPU 20A determines partial weight of each commodity. That is, the CPU 20A determines partial weight of each commodity on the basis of the partial weight measured by each of the weighing scales 24-1 to 24-6, which is shown in FIG. 10, and the correspondence between the containers (commodities) and the weighing scales 24-1 to 24-6, which is shown in FIG. 11.

In ACT11, the CPU 20A determines commodity weight of each commodity by adding up the respective partial weight of the commodities. FIG. 12 shows the partial weight of each commodity and the commodity weight of each commodity, which is determined in the processing of ACT11. As shown in FIG. 12, corresponding to the container Y1 (commodity 1), commodity weight "190 g" is obtained by adding up the partial weight measured by the first weighing scale 24-1, the partial weight measured by the second weighing scale 24-2, the partial weight measured by the fourth weighing scale 24-4, and the partial weight measured by the fifth weighing scale 24-5. Similarly, corresponding to container Y2 (commodity 2), commodity weight "130 g" is obtained by adding up the partial weight measured by the sixth weighing scale 24-6.

Next, in ACT12, the CPU 20A calculates net weight of each commodity on the basis of the commodity weight of each commodity, which is shown in FIG. 12, and the container weight corresponding to each commodity, which is shown in FIG. 13. That is, the CPU 20A calculates net weight of the commodity by subtracting the container weight from the commodity weight. As a result, as shown in FIG. 14, the CPU 20A obtains data of the commodity weight "190 g", the container weight "5 g", and the net weight "185 g", corresponding to the commodity 1 (commodity identification data 1). Similarly, the CPU 20A obtains data of the commodity weight "130 g", the container weight "4 g", and the net weight "126 g", corresponding to the commodity 2 (commodity identification data 2).

Next, in ACT13, the CPU 20A calculates a price of each commodity on the basis of the data regarding the net weight of each commodity 1, 2 and the unit price of each commodity 1, 2, which is set in the commodity price data. As shown in FIG. 8, in the commodity price data, "120 yen/100 g" is set as the unit price of the commodity 1 and "85 yen/100 g" is set as the unit price of the commodity 2. Thus, the CPU 20A calculates the price "222 yen" with respect to the commodity 1 and the price "107 yen" with respect to the commodity 2.

Moreover, in ACT14, the CPU 20A calculates a total price of the all commodities simultaneously weighed by the weighing unit 24 by summing up the prices of the commodities. That is, the CPU 20A obtains a total price "329 yen" obtained by summing up the price "222 yen" of the commodity 1 and the price "107 yen" of the commodity 2.

Next, in ACT15, the CPU 20A outputs the calculated result of weighing. As an output example of the result of weighing, the CPU 20A causes the display apparatus 20E to display the result of weighing. Further, as an output example of the result of weighing, the CPU 20A sends data regarding the result of weighing to the external apparatus 8. The display apparatus 20E selectively displays, for example, any of the net weight, the price, the commodity weight, the container weight (container type), the unit price, and the like as well as a commodity name indicated by the commodity identification data, in a manner that depends on an object to be output set in advance, for example. Further, in a case where a plurality of commodities are weighed at a time, the display apparatus 20E is also capable of displaying a total price of the plurality of commodities. Note that in a case where the printing apparatus is connected to the weighing apparatus 10, the CPU 20A may cause the printing apparatus to print contents similar to the contents of display on the display apparatus 20E as the result of weighing.

Further, the CPU 20A outputs at least the commodity identification data indicating each of the plurality of commodities and the data regarding the net weight corresponding to the commodity identification data to the external apparatus 8.

For example, in a case where the external apparatus 8 is a printer that issues a label to be attached to a commodity, information regarding a commodity name, a commodity price, net weight, and a unit price can be printed on a sheet for the label. In this case, the CPU 20A outputs data regarding each of the commodity identification data, the price, the net weight, and the unit price of each commodity 1, 2 to the external apparatus 8.

Note that in a case where the external apparatus 8 is a commodity registration apparatus, the commodity price data can be set and kept in the commodity registration apparatus. In this case, the CPU 20A can omit the price calculation processing (ACT13 and ACT14). The CPU 20A outputs, as the result of weighing, the commodity identification data and the data regarding the net weight to the external apparatus 8. The commodity registration apparatus as the external apparatus 8 calculates a price of the commodity indicated by the commodity identification data on the basis of the net weight and the unit price set in the commodity price data, and registers the commodity (including the commodity code and the price) that is an object to be purchased by a customer.

That is, the CPU 20A selects data to be output to the external apparatus 8 as the result of weighing, in a manner that depends on the processing executed in the external apparatus 8.

Although the two objects to be weighed (commodities) is weighed at a time in the above description, a result of weighing can be output by processing similar to that described above also in a case where three or more objects to be weighed are placed and weighed.

As described above, the weighing apparatus 10 according to this embodiment is capable of measuring the weight of each of the plurality of commodities and outputting the result of weighing also in the case where the plurality of commodities are placed on the weighing unit 24. Thus, the weighing can be performed on each of the plurality of commodities, and thus it becomes possible to reduce the work load for measuring the weight of the commodities.

Although the correspondence of the weighing scales 24-1 to 24-6 to each of the containers Y1, Y2 (commodities 1, 2) is determined on the basis of the image taken by the camera 22 in the above description, the weighing scales 24-1 to 24-6 may be grouped in accordance with the objects to be weighed in accordance with an instruction by a user's input operation, for example. For example, in a case where two commodities are placed on and weighed by the weighing unit 24 at the same time, the weighing scales 24-1 to 24-6 are grouped into the weighing scales 24-1, 24-2, 24-4, 24-5 and the weighing scales 24-3, 24-6 in advance in accordance with a user's instruction. The two commodities are each placed on and weighed by the corresponding grouped weighing scales 24-1 to 24-6. The CPU 20A calculates commodity weight of each commodity by adding up partial weight in each of the group of the weighing scales 24-1, 24-2, 24-4, 24-5 and the group of the weighing scales 24-3, 24-6. With this configuration, it becomes possible to omit the processing of determining correspondence between the objects to be weighed and the weighing scales 24-1 to 24-6 by using the camera 22.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A weighing apparatus, comprising:
a plurality of weighing scales;
a camera configured to take an image of a region including the weighing scales;

a memory configured to store container data indicating a weight of one or more containers;

a processor configured to:
- determine a first part of the weighing scales on which a first object is placed and a second part of the weighing scales on which a second object is placed based on the image taken by the camera, the first part being one or more of the weighing scales and the second part being other one or more of the weighing scales different from the first part;
- determine a weight of the first object based on a sum of a weight measured by the first part of the weighing scales and a weight of the second object based on a sum of a weight measured by the second part of the weighing scales;
- determine a container of the first object based on the image taken by the camera; and
- determine a net weight of the first object based on the determined weight of the first object and a weight of the container of the first object obtained from the container data.

2. The weighing apparatus according to claim 1, wherein the first part of the weighing scales is two or more of the weighing scales.

3. The weighing apparatus according to claim 2, wherein the second part of the weighing scales is two or more of the weighing scales.

4. The weighing apparatus according to claim 1, wherein the processor determines the net weight of the first object based on the determined weight of the first object minus the weight of the container obtained from the container data.

5. The weighing apparatus according to claim 1, wherein the processor is further configured to determine a price of the first object based on the determined net weight of the first object.

6. The weighing apparatus according to claim 5, wherein the processor is further configured to:
- determine a commodity in the container based on the image taken by the camera; and
- determine the price of the first object based on the determined net weight of the first object and a unit price per unit weight of the determined commodity.

7. The weighing apparatus according to claim 5, wherein the processor is further configured to determine a price of the second object based on the determined weight of the second object, and determine a total price based on the determined price of the first object and the determined price of the second object.

8. The weighing apparatus according to claim 1, wherein the processor is further configured to:
- determine a container of the second object based on the image taken by the camera; and
- determine a net weight of the second object based on the determined weight of the second object and a weight of the container of the second object obtained from the container data.

9. The weighing apparatus according to claim 8, wherein the processor determines the net weight of the second object based on the determined weight of the second object minus the weight of the container of the second object obtained from the container data.

10. The weighing apparatus according to claim 9, wherein the processor is further configured to determine a price of the first object based on the determined net weight of the first object and a price of the second object based on the determined net weight of the second object, and determine a total price based on the determined price of the first object and the determined price of the second object.

11. The weighing apparatus according to claim 1, wherein the processor is further configured to determine the container of the first object based on a shape and a size of the container obtained from the image.

12. The weighing apparatus according to claim 1, wherein each of the weighing scales includes a planer placement surface, and the planer placement surfaces of the weighing scales are flush with each other.

* * * * *